United States Patent [19]

Takahashi

[11] Patent Number: 4,809,756
[45] Date of Patent: Mar. 7, 1989

[54] PIN FOR SPIKE TIRE

[76] Inventor: Sakae Takahashi, 2-3, Yagiyamahoncho 1-chome, Sendai-shi, Miyagi-ken, Japan

[21] Appl. No.: 58,677

[22] Filed: May 26, 1987

Related U.S. Application Data

[63] Continuation of Ser. No. 794,969, Nov. 4, 1985, abandoned.

[30] Foreign Application Priority Data

Jun. 6, 1985 [JP] Japan .............................. 60-84615[U]

[51] Int. Cl.⁴ .............................................. B60C 11/00
[52] U.S. Cl. ...................................... 152/210; 152/211
[58] Field of Search ............... 152/208, 210, 211, 167, 152/169, 185, 222; D12/153, 154

[56] References Cited

U.S. PATENT DOCUMENTS

| | | | |
|---|---|---|---|
| 3,230,997 | 1/1966 | Carlstedt | 152/210 |
| 3,428,105 | 2/1969 | Grötsch | 152/210 |
| 3,583,462 | 8/1971 | Langelo | 152/211 |
| 3,842,880 | 10/1974 | Keinanen | 152/211 |

FOREIGN PATENT DOCUMENTS

| | | |
|---|---|---|
| 1680527 | 8/1970 | Fed. Rep. of Germany . |
| 2400999 | 7/1975 | Fed. Rep. of Germany . |
| 172803 | 10/1982 | Japan .................................. 152/210 |

Primary Examiner—Michael Ball
Attorney, Agent, or Firm—Browdy & Neimark

[57] ABSTRACT

The present invention relates to a structure of a pin for a spike tire to be mounted on a vehicle such as automobile when it runs on a road slippery with ice or snow. The pin is embedded in the tire tread, with the flat end thereof being exposed on the external surface of the tire so that it touches the ice or snow on the road to lower the freezing point thereof. The pin in accordance with the present invention is especially characterized in that the exposed end of the pin has two flat surfaces parallel to the tire side wall and two slightly convex surfaces which are vertical to the tire side wall, the cross-section of the body portion of the pin being substantially square and the outwardly spreading basal portion of the pin being oval-shaped, so that when the vehicle starts to move or is braked, said slightly convex vertical surfaces of the pin are selectively forced to project from the tire in accordance with the tire deformation.

1 Claim, 2 Drawing Sheets

FIG.1
FIG.2
FIG.3
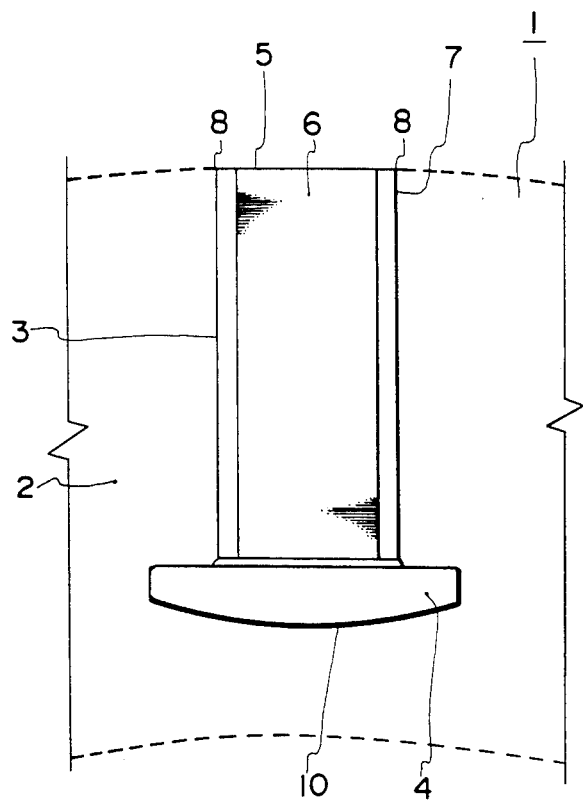
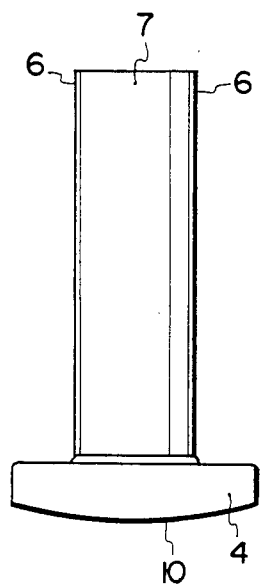
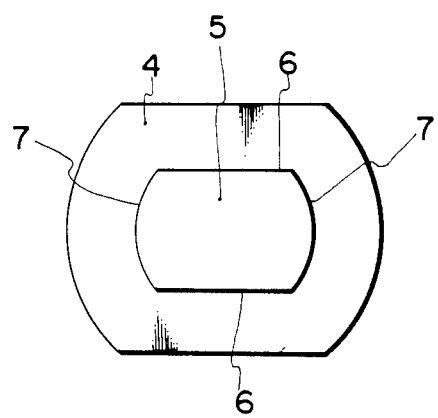

PIN FOR SPIKE TIRE

This application is a continuation, of application Ser. No. 794,969, filed Nov. 4, 1985 now abandoned.

FIELD OF THE INVENTION

The invention disclosed herein relates to the field of art relating to the structure of a pin for a spike tire mounted on a vehicle such as an automobile when it runs on a snow-covered or frozen road.

DESCRIPTION OF THE PRIOR ART

Generally, wheeled vehicles running on roads which are covered with ice or snow employ spike tires or have snow chains fitted to conventional tires to provide extra traction. Since chains are both difficult and annoying to install, and since they adversely affect the performance of the vehicle, spike tires are preferred in regions where roads are covered with snow and ice throughout the winter.

As is well known, the spike tire has a plurality of pins driven thereinto with the pin ends exposed on the external peripheral surface of the tire so that the exposed pin ends, when pressed against a snow or ice surface, melt the snow or ice by lowering the freezing point thereof and bite into the road surface to prevent slippage of the tire.

A disadvantage of conventional pins used in such spike tires compared to conventional tires with chains was that a vehicle with spike tires could not stop as quickly or in as short a distance as a vehicle equipped with snow chains, because chains provided more traction than pins.

Moreover, spike tires sometimes broke traction when wheels locked, permitting the vehicle to go into a dangerous skid.

Although spike tires do not produce the strong vibrations which are characteristic of a vehicle running with snow chains mounted on the tires, the conventional spike tire permits lateral rolling of the vehicle, which makes driving difficult.

Further, pins embedded in a spike tire tend to loosen as the tire wears, so much so that they sometimes fall out of the tire.

Another problem with spike tires stems from the fact that the exposed pin, protruding from the surface of the tire, is subject to frequent and severe impacts on irregular road surfaces.

Such impacts may damage both the pin and the tire, so that fuel consumption increases and the vehicle is difficult to control on a normal road surface, because the damaged parts of the tire impart an erratic motion to the vehicle at high speeds.

Of course, noise also increases.

SUMMARY OF THE INVENTION

The first object of the present invention is to solve the problems associated with the conventional structure of pins for spike tires, and the second object of the present invention is to provide a novel structure of a pin for spike tires which, while maintaining the innate advantages of the spike tire in not imparting vibration to the vehicle, provides a smooth ride, and reduces the distance required to stop the vehicle.

A third object of the present invention is to provide a quieter ride, will not damage the road surface nor allow the pin to fall out of the tire as the tire wears.

A another object of the present invention is to provide a spike tire which represents a significant advance in the automotive field in terms of both safety and utility.

BRIEF DESCRIPTION OF THE DRAWINGS

FIG. 1 is a front view of an embodiment of the present invention.

FIG. 2 is a side view of a pin.

FIG. 3 is a top view of a pin.

DETAILED DESCRIPTION OF THE PREFERRED EMBODIMENT

Figure 4:
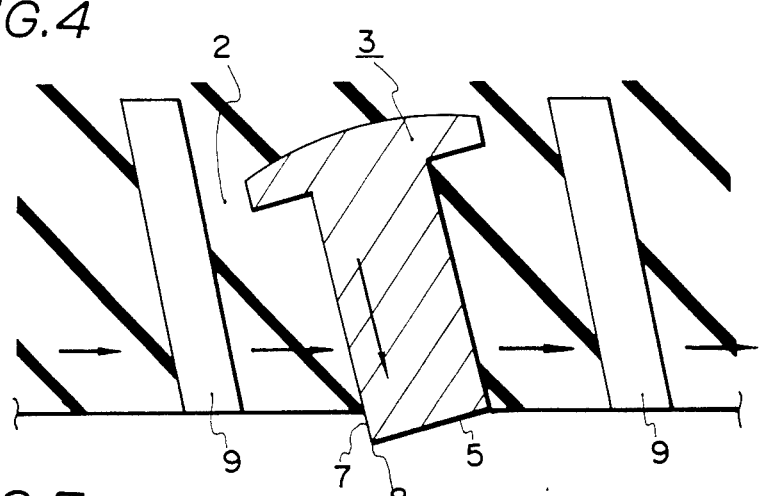
FIG. 4 is sectional view of a portion of a tire showing the condition of the pin during braking of the vehicle while running on a snow-covered or icy road, at the time of starting on a snow-covered or icy road and during running on a normal road.

As illustrated in FIGS. 1, 2 and 3, a plurality of pins 3 made of cemented carbide or a similar material in accordance with this invention are embedded in the tread 2 of tire 1.

The cross-section of the body portion of the pin 3 is substantially square so as to prevent any turning motion of the pin which is embedded in the tire tread, while the outwardly spreading oval-shaped basal portion 4 of the pin is secured in position by the tire tread 2.

Thus, the outwardly spreading oval-shaped basal portion 4 of the pin 3 is designed to perform the pin locking function relative to the tread 2 and to avoid damaging the tread 2.

The distal end of the pin 3 is flattened to form a flat face 5 which is entirely exposed from the external surface of the tire 1 at the same surface level, as shown in FIG. 1. The pin 3 has two flat surfaces 6, 6 parallel to the tire side wall and two slightly convex lateral surfaces 7, 7 extending substantially transverse the tire side wall and which is positioned longitudinally in relation to the tire as it contacts the ground.

The flat surfaces 6, 6 function to prevent lateral slippage while the slightly convex surfaces 7, 7 and a protuberance 8 formed by each said slightly convex surface 7 and flat end face 5 function to prevent slippage of the tire 1 when braking or starting, thereby reducing the distance required to stop the vehicle.

Tire 1 is provided with grooves 9, and the bottom face 10 of the basal portion 4 of the pin 3 is convex.

When a vehicle fitted with tires 1 having a plurality of pins 3 embedded therein runs on a snow-covered or frozen road the flat end face 5 of each pin 3 presses against surface of the ice or snow to melt it by lowering the freezing point so that the end of the pin bites into the surface of the ice or snow to exert a spiking action on the road surface.

When the vehicle sways or turns, imparting a lateral slippage force to the rear wheels, the flat surfaces 6, 6 at the pin end counteract the lateral rolling of the vehicle to prevent slippage.

When the running vehicle is braked, the tire tread 2 is deformed along its circumference as shown in FIG. 4, allowing the force to escape into the grooves 9, and the pin 3 is caused to tilt in the tread 2 owing to the elasticity of rubber.

Accordingly, the slightly convex surfaces 7, oriented transversely to the tire side wall and positioned on the front side (left side in FIG. 4) of the tire as it contacts the road, and the protuberance 8 at the corner edge, grip the ice or snow surface to limit slippage of the vehicle, thereby reducing distance required to stop the vehicle.

Figure 5:
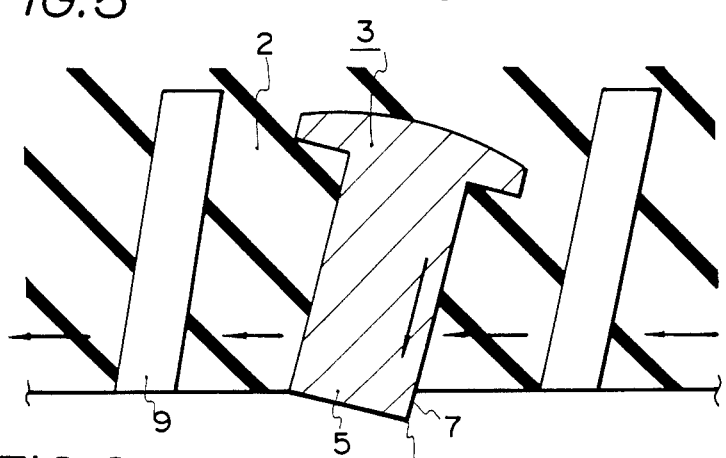
FIG. 5 is sectional view of a portion of a tire showing the condition of the pin during braking of the vehicle while running on a snow-covered or icy road, at the time of starting on a snow-covered or icy road and during running on a normal road.

When the vehicle is started on a slippery road, the pin 3 is caused to tilt similarly but in the opposite direction, as shown in FIG. 5, and in this case, the slightly convex surface 7 on the opposite side (right side in FIG. 5) and the protuberance 8 at the corner edge of the pin 3 grip the frozen face to prevent slippage of the vehicle.

Figure 6:
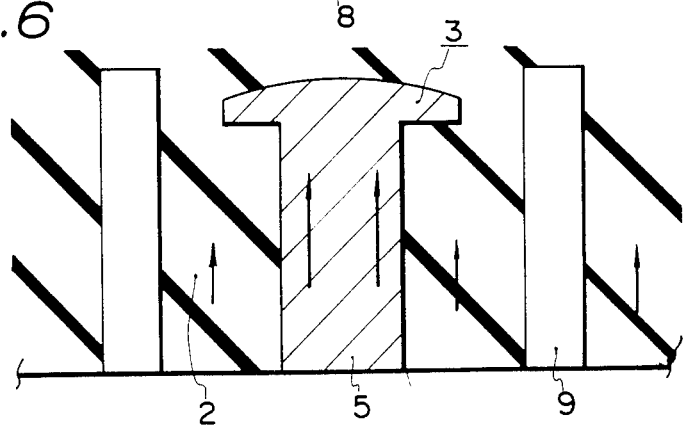
FIG. 6 is sectional view of a portion of a tire showing the condition of the pin during braking of the vehicle while running on a snow-covered or icy road, at the time of starting on a snow-covered or icy road and during running on a normal road.

When the vehicle runs on a road with no snow or on a road covered with melting slush, the flat end face 5 of the pin 3 remains exposed in the same surface level (flush) with the external surface of the tire 1 by expansion of the tire by friction heat and the pin is also impelled toward the center of the tire as the bottom face 10 of the basal portion 4 of the pin 3 is convex as shown in FIG. 6, so that the abrasion of the road by the pin is minimized and therefore the running resistance is reduced, so as to improve fuel economy.

Further, since the basal portion 4 of said pin 3 spreads outward in the tread 2, pin 3 is restrained from falling out of the tire 1, and even if pin 3 should become loosened as the tire wears, pin 3 is restrained from turning in the tire 1 since the cross-section of the body portion of pin 3 is substantially square, and only the positions of the flat surfaces 6 and the slightly convex surfaces 7 are changed so as not to interfere with the spiking action in the lateral and longitudinal directions.

Also, owing to its oval configuration, the basal portion 4, while restraining the pin from rotating, will not damage the tread 2.

The scope of the present invention is, of course, not limited to the above-described embodiment but various changes and modifications are possible.

For instance, the pin end face may be curved.

As described above, the present invention provides the excellent effect that lateral slippage of the vehicle or slippage during braking can be positively reduced to enhance the safety of a running vehicle while maintaining the innate advantage of a spike tire in that it provides a smoother, quieter ride than the chain-fitted tire.

Also, the pin for a spike tire according to the present device is characterized by two flat surfaces parallel to the tire side wall and two slightly convex surfaces vertical to the tire side wall at the exposed end of the pin, said flat surfaces being effective for preventing slippage of the rear wheels in the lateral direction when the vehicle is going through a curve, while said slightly convex surfaces prove effective for preventing slippage in the longitudinal direction during braking or where starting of the vehicle, by taking advantage of the deformation of tire tread in the peripheral direction.

Thus, the present invention enables positive gripping by the tire on a snow surface like a chain-mounted tire while providing the smooth, quiet ride which is characteristic of the spike tire.

Further, since the cross-section of the body portion of the pin is substantially square, and the outwardly spreading basal portion is oval, the pin is restrained from turning even if it should become loosened as the tire wears, and the orientation of both the flat surfaces and the slightly convex surfaces is changed, thus causing no adverse effect on the spiking action.

Also, the basal portion does not damage the tread, noise is reduced, and fuel economy is improved.

In addition, the pin in the present invention is simple and light, and its manufacturing cost is less than half that of the conventional pins.

What is claimed is:

1. In a tire having opposed side walls, a tread surface and a plurality of bores extending into the tire from the tread surface for a predetermined distance, and a plurality of spikes each disposed in a respective one of the bores, each said spike comprising:

a single pin including a base portion and a body portion, body portion having a generally rectangular cross-section, and a longitudinal axis with a length substantially equal to said predetermined distance, said substantially rectangular cross-section being defined by a first pair of opposing flat side walls of a first dimensions and a second pair of opposing convex side walls of a second dimension, and said base portion extending substantially transversely of said body portion longitudinal axis and having a substantially rectangular cross-section defined by a first pair of opposing flat side walls of a first dimension greater than the first dimension of said first pair of opposing flat side walls of said body portion and a second pair of opposing convex side walls of a second dimension greater than the second dimension of said second pair of opposing convex side walls of said body portion, said single pin being disposed in said respective one of said bores such that said pair of opposed longitudinally extensive, flat side walls of said body portion and said base portion extend substantially parallel with the side walls of said tire, wherein, said tire is flexed in forward and back directions by respective changes in force when rolling along a road, respective edges of said convex side walls of said body portion of each said pin extend beyond the surfaces of said tire to grip said road, wherein said base portion further includes an upper face from which said body portion extends and a lower face disposed opposite said upper face, said lower face being convexly shaped, and wherein said body portion includes an end face at an end of the body portion opposite said body portion one end, said end face being flat and substantially flush with the tire tread surface.

* * * * *